(12) United States Patent
Hampe et al.

(10) Patent No.: US 11,091,323 B2
(45) Date of Patent: Aug. 17, 2021

(54) DEVICE FOR EXAMINING A CONVEYOR SYSTEM, AND CONTROL UNIT, MOTORIZED ROLLER, CONVEYOR SYSTEM, AND METHOD

(71) Applicant: INTERROLL HOLDING AG, Sant' Antonino (CH)

(72) Inventors: Andreas Hampe, Sant' Antonino (CH); Herbert Henze, Sant' Antonino (CH); Michael Margowski, Sant' Antonino (CH)

(73) Assignee: INTERROLL HOLDING AG, Sant'Antonino (CH)

( * ) Notice: Subject to any disclaimer, the term of this patent is extended or adjusted under 35 U.S.C. 154(b) by 0 days.

(21) Appl. No.: 16/770,766

(22) PCT Filed: Dec. 10, 2018

(86) PCT No.: PCT/EP2018/084166
§ 371 (c)(1),
(2) Date: Jun. 8, 2020

(87) PCT Pub. No.: WO2019/115454
PCT Pub. Date: Jun. 20, 2019

(65) Prior Publication Data
US 2021/0171288 A1    Jun. 10, 2021

(30) Foreign Application Priority Data
Dec. 11, 2017 (DE) .................... 10 2017 129 460.0

(51) Int. Cl.
*B65G 43/02* (2006.01)
*B65G 13/02* (2006.01)

(52) U.S. Cl.
CPC ............ *B65G 43/02* (2013.01); *B65G 13/02* (2013.01); *B65G 2203/0275* (2013.01); *B65G 2203/0291* (2013.01)

(58) Field of Classification Search
CPC .. B65G 43/02; B65G 13/02; B65G 2206/275; B65G 2203/0291
(Continued)

(56) References Cited

U.S. PATENT DOCUMENTS 7,012,210 B2 * 3/2006 Kibbler ................... B07C 1/02
198/444
7,539,549 B1 * 5/2009 Discenzo ............ F04D 15/0077
324/765.01
(Continued)

FOREIGN PATENT DOCUMENTS

DE    102006054575 A1    5/2008
DE    202009012822       2/2011
(Continued)

*Primary Examiner* — Gene O Crawford
*Assistant Examiner* — Lester Ill Rushin
(74) *Attorney, Agent, or Firm* — Price Heneveld LLP

(57) ABSTRACT

A device for examining a conveyor system having one or more motorized rollers comprises a measuring unit for determining a current profile of the motorized roller, wherein the measuring unit has a first interface and a second interface which are adapted to switch the measuring unit in the conveyor system between the motorized roller and a control unit controlling the motorized roller. A third interface is provided for receiving data on an operating situation present during the determination of the current profile. An evaluation unit is adapted to compare the determined current profile of the motorized roller with a reference profile which is characteristic for the operating situation.

20 Claims, 4 Drawing Sheets

(58) Field of Classification Search
USPC ..................................................... 198/502.1
See application file for complete search history.

(56) References Cited

U.S. PATENT DOCUMENTS 8,887,897 B2    11/2014  Itoh
9,555,977 B2 *   1/2017  Combs .................. B65G 43/10

FOREIGN PATENT DOCUMENTS

| DE | 102011053145 | 3/2012 |
| DE | 102015104130 | 9/2016 |
| DE | 102015114030 | 3/2017 |
| DE | 102016120415 | 4/2018 |
| EP | 1021664 | 7/2000 |
| EP | 1620312 | 2/2006 |
| JP | H11304826 | 11/1999 |
| JP | H11326147 | 11/1999 |
| JP | 2013104795 | 5/2013 |

* cited by examiner

DEVICE FOR EXAMINING A CONVEYOR SYSTEM, AND CONTROL UNIT, MOTORIZED ROLLER, CONVEYOR SYSTEM, AND METHOD

CROSS-REFERENCE TO FOREIGN PRIORITY APPLICATION

The present application claims the benefit under 35 U.S.C. §§ 119(b), 119(e), 120, and/or 365(c) of PCT/EP2018/084166 filed Dec. 10, 2018, which claims priority to German Application No. 10 2017 129 460.0 filed Dec. 11, 2017.

FIELD OF THE INVENTION

The invention relates to a device for examining a conveyor system having a motorized roller, and to a control unit, to a motorized roller, to a conveyor system, and to a method for examining a conveyor system having a motorized roller.

BACKGROUND OF THE INVENTION

Conveyor systems are used for different purposes in logistic applications. They can thus be used, for example, in pallet conveyance, for conveying parcels in parcel dispatch centers, for conveying containers in storage areas of different types, or for baggage transport in airports and in numerous other applications. Here, a conveyor system regularly comprises one or more conveyor sections which each comprises a plurality of rollers which are arranged next to one another and whose circumferential surface in each case serves for receiving the conveyable items. Motorized rollers can likewise be used in conveyor systems having belt conveyors and/or band conveyors in which motorized rollers drive a belt and/or a band, and the belt and/or the band serve/serves for receiving the conveyable items.

In these conveyor sections there can be arranged, on the one hand, nondriven conveyor rollers, which are also referred to as idling rollers or slave rollers which are driveless and are mounted such that they can only be rotated in a conveyor frame. In these conveyor sections there can also be arranged motorized rollers, which are also referred to as driven conveyor rollers and are motor-operated and are set in rotation by means of an electric drive unit. On the one hand, the motorized rollers can serve to transport the conveyable items directly by way of the outer circumferential surface of their roller body. On the other hand, a transmission of the rotation of the motorized roller to one or more idling rollers by means of a transmission element, for example, a belt drive, by the motorized roller also makes it possible for one or more idling rollers to be set in rotation such that they can also drive the conveyable items by way of their outer circumferential surfaces.

Conveyor rollers, and, in particular, motorized rollers, are known for example from DE 10 2006 054 575 A1, EP 1 02 1664 B1, DE 20 2009 012 822 U1, DE 10 2015 104 130, DE 10 2015 114 030 or DE 10 2016 120 415 of the applicant.

In addition to general control and regulation requirements which necessitate certain transmission mechanisms for transmitting the actual state from the conveyor section into a control unit and for transmitting a desired state from the control unit into the motorized roller, one requirement placed on such motorized rollers is the fact that it is desirable to carry out the operation of such a conveyor section with a high degree of reliability. This is based on the fact that the typical intralogistic applications regularly involve conveying requirements in which a failure of the conveyor section entails serious time delays and financial harm going far beyond the pure financial input for replacing the component triggering the disturbance. Moreover, it is frequently the case in conveyor sections that use is made of a multiplicity of such motorized rollers that therefore constitute technically identical systems in large numbers, with it being the case, however, that the very failure of a single motorized roller limits or completely interrupts the functioning of the entire conveyor section. It is, therefore, an important aim to improve the reliability of the operation of such conveyor sections in which motorized rollers are used.

The German Patent and Trade Mark Office has searched the following further prior art in the priority application to the present application: DE 10 2011 053 145 A1.

SUMMARY OF THE INVENTION

It is, therefore, an object of the present invention to provide an improved device for examining a conveyor system having a motorized roller, and an improved control unit, an improved motorized roller, an improved conveyor system, and an improved method for examining a conveyor system having a motorized roller. It is in particular an object of the present invention to provide a device for examining a conveyor system having a motorized roller, and a control unit, a motorized roller, a conveyor system, and a method for examining a conveyor system having a motorized roller which increase the reliability and/or efficiency and/or performance and/or allow savings.

This object is achieved by a device for examining a conveyor system having one or more motorized rollers, the device comprising a measuring unit for determining a current profile of the motorized roller, wherein the measuring unit has a first interface and a second interface which are designed to switch the measuring unit in the conveyor system between the motorized roller and a control unit controlling the motorized roller, a third interface for receiving data on an operating situation which is present during the determination of the current profile, and an evaluation unit which is designed to compare the determined current profile of the motorized roller with a reference profile which is characteristic for the operating situation.

Conveyor rollers, and, in particular, motorized rollers, are preferably constructed in such a way that the roller body is designed to be hollow at least in certain portions and, in particular, has one hollow end, preferably two hollow ends. In the case of motorized rollers, the drive unit is preferably arranged within an interior of the roller body. If the drive unit is arranged within the roller body, no mechanical components arranged outside the roller body are required to generate the rotation of the roller. A drive unit arranged in the interior of the roller body can, for example, have a coupling unit which is designed and arranged to transmit a torque from the drive unit to an inner circumferential surface of the interior of the roller body. Motorized rollers of this design type are used for different purposes in logistic applications, for example, to be mounted in a frame by means of a drum motor shaft and a drum motor axle. The electric drive unit is typically designed to transmit a conveying torque from the drum motor shaft to the drum tube. This transmission can occur via a drum motor gear mechanism comprised by the motorized roller. By contrast, the drum motor axle serves typically only for mounting the motorized rollers in the frame.

A motorized roller can serve, by means of a belt or the like, to drive other devices, for example, a conveyor section consisting of a plurality of conveyor rollers. Furthermore, the motorized roller can be inserted directly as a conveyor member into a conveyor section and bear the conveyable items and convey them by rotation of the motorized roller. A preferred application consists in using the motorized roller in a conveyor band section as a drive element, preferably as an end-side drive element, and in guiding a conveyor band or belt around the drum body with partial wraparound, and in setting said band or belt in movement by rotation of the drum body.

Motorized rollers are used in intralogistics in a wide variety of applications, for example, for conveying baggage, products, parcels, containers, pallets or the like in logistics centers, in industrial manufacturing, in mail distribution centers, in baggage handling and the like. Here, such motorized rollers are regularly used in conveyor sections of relatively large conveyor systems and serve to move the conveyable items. The motorized rollers can be coupled by means of drive belts, chains, and the like to adjacent concomitantly running idling rollers and drive the latter so as thereby to define a uniformly activated conveyor zone. A plurality of such conveyor zones can then be arranged in succession in the conveyor section in order to convey the conveyable items along this conveyor section. Motorized rollers of this kind are also referred to as motor-operated conveyor rollers or roller drives or designated in some other way. A motorized roller can also be a drum motor which is used, for example, to drive a conveyor band as an end-side deflection roller, or in some other form drives a conveyor section with conveyor band or an otherwise designed conveyor section.

In principle, it is a requirement of such motorized rollers in use in conveyor sections and conveying applications that they are able to be operated under open-loop control or closed-loop control in order to convey the conveyable items in a certain manner. Thus, for example, accumulation pressure-free conveyance, so-called ZPA=zero pressure accumulation, or conveyance with a small accumulation pressure, so-called LPA=low pressure accumulation, is often desired in which conveyable items situated on the conveyor section do not come into contact with one another or come into contact with one another only with small accumulation pressure, with the result that damage to a conveyable item cannot arise as a result of added-up contact forces. Furthermore, it is known to convey conveyable items on a conveyor section with single discharge or with block discharge, that is to say to operate the conveyance of conveyable items in such a way that in each case one conveyable item is conveyed further and a subsequent conveyable item is conveyed, likewise individually, into the resultant gap, or to convey a plurality of conveyable items simultaneously while maintaining their spacing. For the purpose of this closed-loop control and open-loop control, it is known practice to obtain certain data from the conveyor section, for example, via a light barrier sensor, in order to be able to feed information into a controller via the position of a conveyable item, and furthermore to send control commands to a motorized roller in order to set it in operation or to stop it or in order for example to control its rotational speed. What is to be understood here by rotational speed is the number of revolutions per minute, with this rotational speed being based on the revolutions per minute of the motor or the revolutions per minute of the conveyor roller, which can be different from one another if the drive unit comprises a gear mechanism.

The solution according to the invention makes provision to determine the current profile of a motorized roller by means of a device for examining a conveyor system and to compare this current profile with a characteristic reference profile. For this purpose, data on the operating situation present during the determination of the current profile are detected, and a reference profile which is characteristic for this operating situation is used for the comparison. For this purpose, the measuring unit of the device is switched, with its first and second interface, between the motorized roller and the control unit. In order to be able to assign the determined current profile to an operating situation, data on an operating situation which is present during the determination of the current profile are also detected via a third interface of the measuring unit.

What can be understood by reference profile in the present description is preferably a value profile, in particular, over a certain time period. A value profile can also be derived from profiles of one, two, or more individual variables. It is also possible for a previously determined current profile of the same motorized roller or of another motorized roller to be used as reference profile. As a result, changes over the course of time and/or changes in the conveyor system or parts thereof can be identified and/or comparisons with other, preferably comparable, parts of a conveyor system or other, preferably comparable, conveyor systems can be made.

The invention is based, inter alia, on the finding that certain profiles of the current, in particular, the input current, of the motorized roller are characteristic for certain operating situations. In particular, such characteristic profiles are used as reference profiles. Furthermore, the invention is based on the finding that comparison of the determined current profile of the motorized roller with a reference profile which is characteristic for the operating situation allows conclusions to be drawn not only on the motorized roller itself but also on the conveyor zone and/or the conveyor system, in particular, conclusions on the efficiency, appropriateness of the design or possibilities for increasing performance or saving costs. In this way, a particularly simple and efficient and at the same time reliable possibility of examining relatively large parts of a conveyor system or an entire conveyor system can be provided by determining the current profile of the motorized roller in a certain operating situation.

The third interface is preferably designed to receive data from an operating state sensor. A preferred development is distinguished by the fact that the operating state sensor is designed as a light barrier sensor or comprises a light barrier sensor. The operating state sensor can preferably be designed to detect if a conveyable item enters and/or exits a conveyor zone, in particular, a certain portion of a conveyor zone.

According to a preferred embodiment, the evaluation unit is designed to check whether the determined current profile of the motorized roller deviates from the reference profile, in particular, also in certain portions. It is also preferred that the evaluation unit is designed to check whether a deviation of the determined current profile of the motorized roller from the reference profile, preferably in a certain portion, exceeds a predetermined value. It is further preferred that the evaluation unit is designed to check whether the determined current profile of the motorized roller undershoots or exceeds the reference profile, in particular in a certain portion, by a predetermined value. This is preferably part of the comparison of the determined current profile of the motorized roller with the reference profile.

If the determined current profile of the motorized roller undershoots or exceeds the reference profile, for example, in a certain portion, by a predetermined value, this can be an indication of a property of the conveyor system and/or of the conveyor zone and/or of the motorized roller, such as, for example, an inappropriate design and/or activation and/or a defect (for example, tear in the driven belt, bearing damage, etc.).

Furthermore, it is preferred that the evaluation unit is designed to receive a signal from an operating state sensor of the conveyor system and to use the signal to qualify the determined current, for example, to derive information on the operating state, in particular to check whether the reference operating state is present.

The signal preferably comprises data from the operating state sensor or is a data signal. A preferred development is distinguished by the fact that the operating state sensor is designed as a light barrier sensor or comprises a light barrier sensor. The operating state sensor can preferably be designed to detect if a conveyable item enters and/or exits a conveyor zone, in particular, a certain portion of a conveyor zone.

Furthermore, it is preferred that the evaluation unit is designed to determine a temperature, for example, by means of a temperature sensor, and to use the determined temperature to qualify the determined current, for example to derive information on the operating state, in particular to check whether the reference operating state is present.

What is to be understood by temperature in this description is both an internal temperature of the motorized roller and an ambient temperature of the motorized roller and/or of the conveyor zone and/or of the conveyor system, for example the room temperature. A temperature sensor can be, for example, an ambient temperature sensor and/or an internal temperature sensor.

Taking the internal temperature of the motorized roller into consideration has the advantage that overheating states can be identified. Taking the ambient temperature of the motorized roller into consideration has the advantage that influencing factors outside the motorized roller acting on the internal temperature of the motorized roller can be taken into consideration (such as, for example, heating of the space due to strong solar radiation) and in this way the internal temperature of the motorized roller can be assessed differently and/or correlated with the room temperature, in particular, for a further use.

It is additionally preferred that the evaluation unit is designed to detect operating hours of the motorized roller and to use the detected operating hours to qualify the determined current, for example, to derive information on the operating state, in particular, to check whether the reference operating state is present. It can thereby be ensured that a motorized roller has been "run in."

In a preferred embodiment, there is provision that the operating situation comprises two or more different operating states, in particular, the operating states of acceleration and/or loading and/or transport and/or unloading and/or idling and/or braking or deceleration, for example with feedback of braking energy and/or standstill.

An operating situation can refer either to only one operating state and/or comprise two or more operating states. An operating state can also be understood to be a portion of an operating situation. The reference profile can also preferably comprise reference subprofiles which are characteristic for the respective operating states in the comparison. Reference subprofiles which are characteristic for the respective operating states are preferably used for the comparison. The current profile of the motorized roller can also preferably have portions which correspond to the operating states and reference subprofiles.

It is also preferred that the evaluation unit is designed to compare the determined current profile of the motorized roller with a reference subprofile which is characteristic for the respective operating state. A comparison on the basis of different operating states allows more precise examination of the conveyor system. Since the current profiles generally differ from one another in different operating states, the use of different reference subprofiles which are characteristic for the respective operating state makes it possible to improve the quality of the conclusions.

A preferred development is distinguished by the fact that the evaluation unit is designed to output an optimization parameter on the basis of the comparison. It is particularly preferred that the optimization parameter can comprise one or more of the following values:

change, in particular increase or reduction, in the conveying speed of the system and/or of a subsystem and/or motorized roller, change, in particular increase or reduction, in the power of a motorized roller, exchange of a motorized roller for another, in particular another motorized roller of another power class, change, in particular increase or reduction, in the number of motorized rollers and/or conveyor rollers and/or conveyor zones of the conveyor system, change, in particular increase or reduction, in the number of motorized rollers and/or conveyor rollers in a conveyor zone of the conveyor system, change, in particular increase or reduction, in a gear mechanism step-down ratio, change, in particular increase or reduction, in the standstill times of the conveyor system and/or subsystem and/or motorized roller, change, in particular increase or reduction, in the acceleration of the motorized roller.

Starting from the comparison, it is preferably also possible with the device to output or derive optimization parameters. A conveyor system can thus preferably not only be examined or diagnosed but also improved, or at least indicators can be given in the form of optimization parameters, whereby improvements can be achieved.

In a preferred embodiment, there is also provision that the evaluation unit is designed to output a control signal for control on the basis of the comparison, in particular, of the motorized roller and/or of the conveyor zone and/or of the conveyor system. In this way, an identified improvement potential can be converted into an improved control.

In particular, it is possible, preferably on the basis of the current profile determined for a motorized roller, to output or generate optimization parameters and/or control signals for this motorized roller and/or conveyor zone and/or conveyor system and/or for other motorized rollers and/or other conveyor zones and/or other conveyor systems. With the determination of the current profile for a motorized roller it is thus possible to draw conclusions on further, different parts of the conveyor system and/or even for other conveyor systems, in particular, if similar conditions are present.

According to a preferred embodiment, there is provision that the first and/or the second interface are/is designed as an adapter. A design as an adapter allows a particularly simple interconnection between the motorized roller and the control unit. The interconnection preferably occurs at a present, releasable (plug) connection between the motorized roller and control unit.

It is also preferred that the third interface is designed to receive data on the operating situation which is present during the determination of the current profile from an operating state sensor. The third interface is also preferably designed to receive data on two or more operating states which are present during the determination of the current profile from an operating state sensor.

A preferred development is distinguished by the fact that the device comprises a memory unit in which reference profiles which are characteristic for different operating situations are stored. Reference subprofiles which are characteristic for different operating states can preferably also be stored in the memory unit.

It is also preferred that the device comprises a memory unit in which optimization parameters are stored, in particular, optimization parameters for different characteristic reference profiles and/or for different characteristic reference subprofiles and/or for different comparison results.

A preferred development is distinguished by the fact that a measuring unit is designed to determine a fed-back current and/or total performed electrical work of the motorized roller, in particular, as part of the determination of the current profile and/or, in particular, during an operating situation.

If the determination of the current profile of the motorized roller also comprises the determination of a fed-back current and/or of total performed electrical work, particularly qualified conclusions can be drawn on the motorized roller and/or the conveyor zone and/or the conveyor system.

According to a further aspect of the invention, the object stated at the outset is achieved by a method for examining a conveyor system having one or more motorized rollers, the method comprising
determining a current profile of the motorized roller, preferably by means of an above-described device or by means of a control unit controlling the motorized roller,
detecting an operating situation which is present during the determination of the current profile, and
comparing the determined current profile of the motorized roller with a reference profile which is characteristic for the detected operating situation.

The method for examining a conveyor system having a motorized roller can preferably be carried out with an above-described device for examining a conveyor system having a motorized roller.

If a control unit of a motorized roller and/or of a conveyor zone and/or of a conveyor system is designed for carrying out the method for examining a conveyor system having a motorized roller, the method can preferably also be carried out by means of the control unit. In this variant, the examination of the conveyor system then does not require a separate device for examining a conveyor system having a motorized roller. Rather, the method for examining a conveyor system having a motorized roller can be carried out without a separate device for examining a conveyor system having a motorized roller having to be provided and/or connected. In this way, a particularly simple implementation of the method for examining a conveyor system having a motorized roller is possible.

The steps of the method for examining a conveyor system having a motorized roller are preferably carried out multiple times, in particular for different motorized rollers of a conveyor system which are preferably arranged at different and/or important and/or comparable points of the conveyor system. This can improve the quality of the examination. These multiple comparisons are preferably taken into consideration during the outputting of an optimization parameter and/or during the generation of a control signal.

According to a further aspect of the invention, the object stated at the outset is achieved by a control unit for a motorized roller and/or a conveyor zone of a conveyor system, wherein the control unit is designed to carry out the above-described method for examining a conveyor system having a motorized roller.

According to a further aspect of the invention, the object stated at the outset is achieved by a motorized roller for a conveyor system, wherein the motorized roller is designed to carry out the above-described method for examining a conveyor system having a motorized roller.

According to a further aspect of the invention, the object stated at the outset is achieved by a conveyor system having a motorized roller and a control unit, wherein the conveyor system is designed to carry out the above-described method for examining a conveyor system having a motorized roller.

The aspects according to the invention and possible developments thereof have features which make them particularly suitable to be used in an above-described method and/or with an above-described device and the respective developments. With regard to the advantages, embodiment variants and embodiment details of these further aspects of the invention and possible developments thereof, reference is made to the foregoing description pertaining to the corresponding device and method features.

BRIEF DESCRIPTION OF THE DRAWINGS

A preferred embodiment of the invention is described by way of example on the basis of the appended figures, in which.

DETAILED DESCRIPTION OF THE EMBODIMENTS

Figure 1:
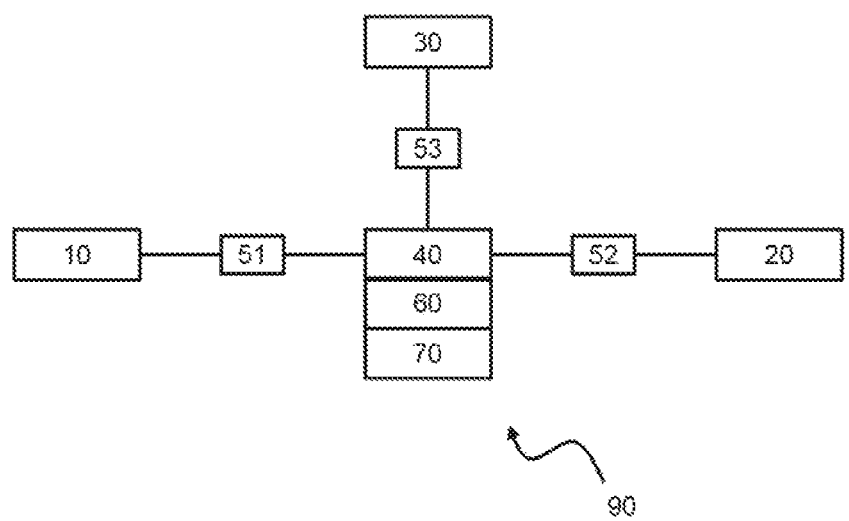
FIG. 1 shows a schematic illustration of one embodiment of the device for examining a conveyor system having a motorized roller.

FIG. 1 shows a schematic illustration of one embodiment of the device for examining a conveyor system having a motorized roller.

FIG. 1 shows a motorized roller 10 and a control unit 20 controlling the motorized roller 10. The motorized roller 10 and the control unit 20 are part of a conveyor system which can comprise still further elements.

The device 90 comprises a measuring unit 40, an evaluation unit 60, and a memory unit 70 and also a first interface 51, a second interface 52, and a third interface 53.

The first and second interfaces 51, 52 are used to connect the device between the motorized roller 10 and the control unit 20. The first and second interfaces 51, 52 are designed as an adapter by which an interconnection at a present, releasable (plug) connection between the motorized roller and control unit is possible in a particularly simple manner.

The third interface 53 serves to obtain data on an operating situation present during the determination of a current profile of the motorized roller 10 from an operating state sensor 30.

The evaluation unit 60 is designed to compare the determined current profile of the motorized roller 10 with a reference profile which is characteristic for the operating situation. For this purpose, the evaluation unit 60 can access data stored in the memory unit 70, in particular, reference profiles characteristic for different operating situations and/or optimization parameters for different characteristic reference profiles and/or for different comparison results.

Figure 2:
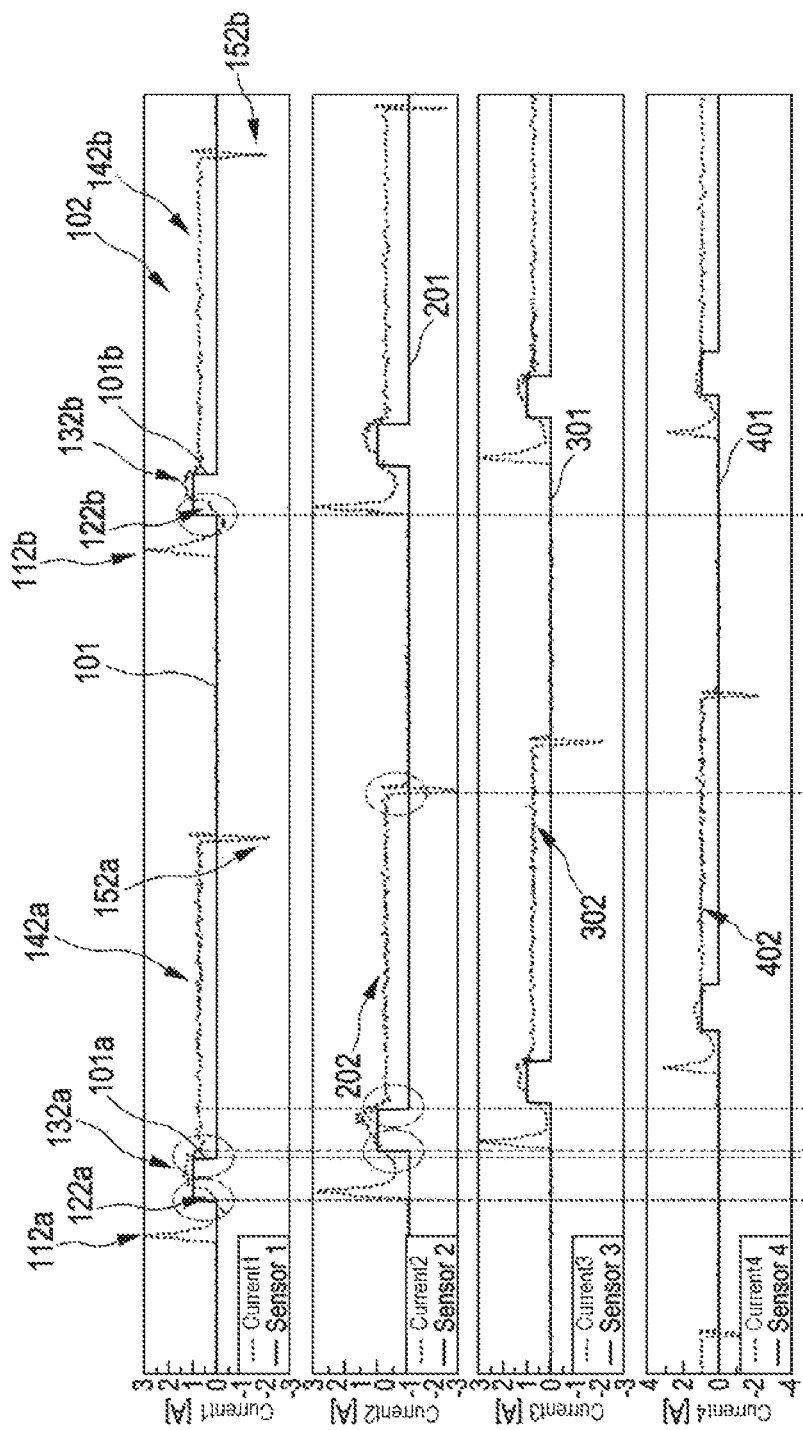
FIG. 2 shows the determined current profile of four motorized rollers.

FIG. 2 shows the determined current profile of four motorized rollers (current 1, current 2, current 3, current 4) and also the associated operating situations, which have been detected by four operating state sensors (sensor 1, sensor 2, sensor 3, sensor 4), over time.

The operating situations determined by the four operating state sensors are represented by the lines 101, 201, 301, 401. The signal profile of the first operating state sensor has a first maximum 101a and a second maximum 101b. These maxima 101a, 101b indicate that a conveyable item reaches the first motorized roller or the associated first conveyor zone. Corresponding, but time-staggered maxima are also evident in the signal profiles 102, 202, 302, 402 of the further operating state sensors. Different operating states can be derived therefrom, in particular, operating states before, during or after the maxima 101a, 101b.

Before the maxima 101a, 101b, the determined current profile of the first motorized roller also shows the maxima 112a, 112b. After descending to local minima, the determined current profile of the first motorized roller then shows ascending phases 122a, 122b to local maxima 132a, 132b and also subsequent idling situations 142a, 142b, with minima 152a, 152b. Corresponding, but time-staggered profiles are also evident in the profiles 202, 302, 402 of the determined currents of the further motorized rollers.

These current profiles 102, 202, 302, 402 are compared with reference profiles which correspond to the respective operating situations. In particular, use can be made for this purpose of reference subprofiles which are characteristic for different operating states of operating situations and are correspondingly compared with portions of the current profiles 102, 202, 302, 402.

Figure 3:
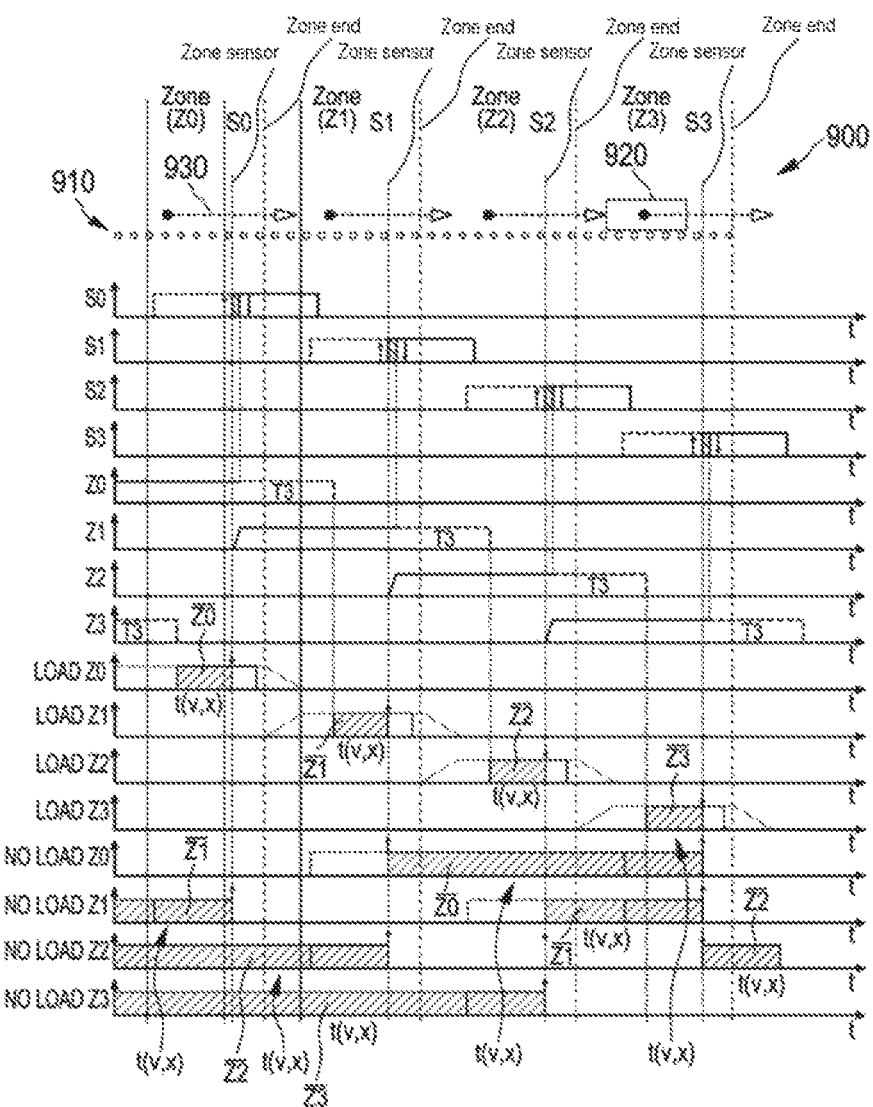
FIG. 3 shows a comparison of four motorized rollers in different operating states.

FIG. 3 shows a comparison of four motorized rollers in different operating states. In the upper part of FIG. 3, a conveyor system 900 is schematically illustrated first of all. The conveyor system 900 has a plurality of conveyor rollers 910 (both motorized rollers and nondriven conveyor rollers) in four conveyor zones Z0, Z1, Z2, Z3. Each conveyor zone Z0, Z1, Z2, Z3 has a respective operating state sensor and a motorized roller. There is also schematically illustrated a conveyable item 920 which is moved in conveying direction 930 from conveyor zone to conveyor zone.

In the lower part of FIG. 3, the operating situations with different operating states, said operating situations being determined with the four operating state sensors S0, S1, S2, S3, and also the associated states of the four motorized rollers in the four conveyor zones are schematically illustrated over time. Represented by Z0, Z1, Z2, Z3 is first of all the general activity of a conveyor zone. The loading state by a conveyable item is then represented by LOAD Z0, LOAD Z1, LOAD Z2, LOAD Z3, and the state without loading is represented by NO LOAD Z0, NO LOAD Z1, NO LOAD Z2, NO LOAD Z3.

Figure 4:
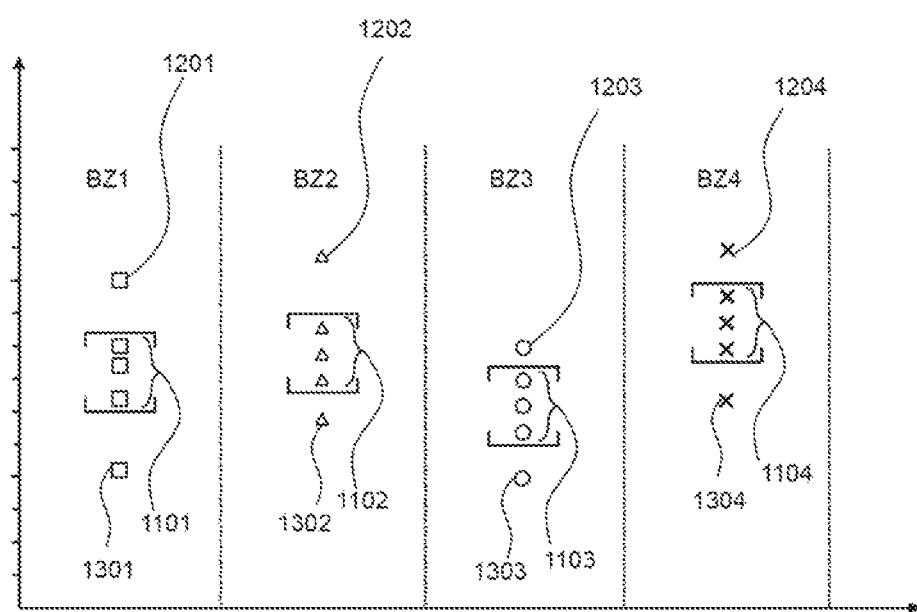
FIG. 4 shows a comparison of the average values for the determined current profile of a motorized roller with respective average values for the reference profiles in four operating states.

FIG. 4 shows a comparison of the average values for the determined current profile of a motorized roller with respective average values for the reference profiles in four operating states BZ1, BZ2, BZ3, BZ4. Operating state BZ1 corresponds to loading, operating state BZ2 corresponds to transport, operating state BZ3 corresponds to unloading, and operating state BZ4 corresponds to the idling situation.

For the illustration in FIG. 4, average values for the reference profiles in the different operating states are formed from a number of reference measurements. Likewise, average values in the different operating states have been formed for the respectively determined current profiles.

Average values for the reference profiles in the respective operating states BZ1, BZ2, BZ3, BZ4 for a conveyable item are represented by 1101, 1102, 1103, 1104.

Also represented in FIG. 4 are the average values for the determined current profile for a conveyable item, specifically by 1201, 1202, 1203, 1204 in the respective operating states BZ1, BZ2, BZ3, BZ4.

As is evident, the average values 1201, 1202, 1203, 1204 for the determined current profile lie above the average values for the reference profiles. This can be an indication of a fault or disturbance case which results in the overcoming of a relatively high mass inertia. This can be caused, for example, by a disturbing body or the defect of a drive component. A drive component can be any component which causes a movement; for example, a drive component can be a motorized roller, a slave roller, a drive belt, a drive element or a drive unit.

Also represented in FIG. 4 are the average values for the determined current profile for a conveyable item, specifically by 1301, 1302, 1303, 1304 in the respective operating states BZ1, BZ2, BZ3, BZ4.

As is evident, the values 1301, 1302, 1303, 1304 for the determined current lie below the reference values. This can be an indication of a fault or disturbance case which, for example, decouples a passive drive component, such as an interrupted power transmission/drive belt.

The invention claimed is:

1. A device for examining a conveyor system having one or more motorized rollers, the device comprising:
    a measuring unit for determining a current profile of the motorized roller, wherein the measuring unit has a first interface and a second interface which are adapted to switch the measuring unit in the conveyor system between the motorized roller and a control unit controlling the motorized roller;
    a third interface for receiving data on an operating situation present during the determination of the current profile; and
    an evaluation unit which is adapted to compare the determined current profile of the motorized roller with a reference profile which is characteristic for the operating situation.

2. The device as claimed in claim 1, wherein the operating situation comprises two or more different operating states.

3. The device as claimed in claim 2, wherein the operating situation comprises at least one or more of acceleration, loading, transport, unloading, idling, braking, deceleration, or standstill.

4. The device as claimed in claim 1, wherein the evaluation unit is adapted to perform a comparison between the determined current profile of the motorized roller and a reference subprofile which is characteristic for the respective operating state.

5. The device as claimed in claim 4, wherein the evaluation unit is adapted to output an optimization parameter on the basis of the comparison.

6. The device as claimed in claim 5, wherein the optimization parameter comprises at least one or more of the following values:

a change in the conveying speed of the system, subsystem, and/or motorized roller;

a change in the power of a motorized roller;

exchange of a first motorized roller for a second motorized roller;

a change in the number of motorized rollers, conveyor rollers, and/or conveyor zones of the conveyor system;

a change in the number of motorized rollers and/or conveyor rollers in a conveyor zone of the conveyor system;

a change in a gear mechanism step-down ratio;

a change in the standstill time of the conveyor system, subsystem, and/or motorized roller; or a change in the acceleration of the motorized roller.

7. The device as claimed in claim 4, wherein the evaluation unit is adapted to output a control signal for control on the basis of the comparison.

8. The device as claimed in claim 1, wherein the first or the second interface comprises an adapter.

9. The device as claimed in claim 1, wherein the third interface is adapted to receive data on the operating situation present during the determination of the current profile from an operating state sensor.

10. The device as claimed in claim 1, further comprising a memory unit in which a plurality of reference profiles which are characteristic for different operating situations are stored.

11. The device as claimed in claim 1, comprising a memory unit in which a plurality of optimization parameters are stored.

12. The device as claimed in claim 11, wherein the plurality of optimization parameters comprise optimization parameters for different characteristic reference profiles.

13. The device as claimed in claim 11, wherein the plurality of optimization parameters comprise optimization parameters for different comparison results.

14. The device as claimed in claim 1, wherein the measuring unit is adapted to determine a fed-back current.

15. The device as claimed in claim 1, wherein the measuring unit is adapted to determine total performed electrical work of the motorized roller.

16. A method for examining a conveyor system having one or more motorized rollers, the method comprising the steps of:
   determining a current profile of the motorized roller;
   detecting an operating situation present during the determination of the current profile; and
   comparing the determined current profile of the motorized roller with a reference profile which is characteristic for the detected operating situation.

17. A conveyor system comprising:
   a motorized roller;
   a control unit controlling the motorized roller;
   a measuring unit for determining a current profile of the motorized roller, wherein the measuring unit has a first interface and a second interface which are adapted to switch the measuring unit in the conveyor system between the motorized roller and the control unit controlling the motorized roller;
   a third interface for receiving data on an operating situation present during the determination of the current profile; and
   an evaluation unit which is adapted to compare the determined current profile of the motorized roller with a reference profile which is characteristic for the operating situation.

18. The conveyor system as claimed in claim 17, further comprising an operating state sensor for detecting an operating situation present during the determination of the current profile;
   wherein the evaluation unit further compares the determined current profile of the motorized roller with the reference profile which is characteristic for the detected operating situation.

19. A motorized roller adapted for use in a conveyor system comprising:
   a control unit controlling the motorized roller;
   a measuring unit for determining a current profile of the motorized roller, wherein the measuring unit has a first interface and a second interface which are adapted to switch the measuring unit in the conveyor system between the motorized roller and the control unit controlling the motorized roller;
   a third interface for receiving data on an operating situation present during the determination of the current profile; and
   an evaluation unit which is adapted to compare the determined current profile of the motorized roller with a reference profile which is characteristic for the operating situation.

20. A control unit adapted for use in a conveyor system comprising:
   a motorized roller controlled by the control unit;
   a measuring unit for determining a current profile of the motorized roller, wherein the measuring unit has a first interface and a second interface which are adapted to switch the measuring unit in the conveyor system between the motorized roller and the control unit controlling the motorized roller;
   a third interface for receiving data on an operating situation present during the determination of the current profile; and
   an evaluation unit which is adapted to compare the determined current profile of the motorized roller with a reference profile which is characteristic for the operating situation.

* * * * *